(12) United States Patent
Oh (10) Patent No.: US 8,811,259 B2
(45) Date of Patent: Aug. 19, 2014

(54) METHOD FOR CONFIGURING WIRELESS LOCAL AREA NETWORK IN WIRELESS METROPOLITAN AREA NETWORK AND WIRELESS COMMUNICATION SYSTEM SUPPORTING THE SAME

(75) Inventor: Se-Jong Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1540 days.

(21) Appl. No.: 11/655,755

(22) Filed: Jan. 19, 2007

(65) Prior Publication Data

US 2007/0189256 A1   Aug. 16, 2007

(30) Foreign Application Priority Data

Jan. 19, 2006   (KR) .................. 10-2006-0005875

(51) Int. Cl.
*H04W 88/02* (2009.01)
*H04W 74/06* (2009.01)
*H04W 52/02* (2009.01)
*H04W 88/06* (2009.01)
*H04W 84/04* (2009.01)
*H04W 88/04* (2009.01)
*H04W 84/12* (2009.01)
*H04W 48/10* (2009.01)

(52) U.S. Cl.
CPC .......... *H04W 74/06* (2013.01); *H04W 52/0216* (2013.01); *H04W 52/0219* (2013.01); *H04W 88/06* (2013.01); *H04W 84/04* (2013.01); *H04W 88/04* (2013.01); *H04W 84/12* (2013.01); *H04W 48/10* (2013.01)
USPC .......................................................... 370/315

(58) Field of Classification Search
USPC ........ 455/7, 13.1, 552.1–553.1, 500, 507, 73, 455/509, 517, 11.1, 16, 41.1–41.3, 426.1, 455/426.2; 370/337–338, 328, 315, 351, 370/401, 230
See application file for complete search history.

(56) References Cited

U.S. PATENT DOCUMENTS

| 7,173,924 | B2 | 2/2007 | Shaheen et al. | |
| 7,269,406 | B2 * | 9/2007 | Qi | 455/405 |
| 7,376,112 | B2 * | 5/2008 | Liu | 370/338 |

(Continued)

FOREIGN PATENT DOCUMENTS

| KR | 10-2001-0018670 | 3/2001 |
| KR | 2002-0079726 | 10/2002 |
| KR | 10-2005-0016725 | 2/2005 |
| KR | 10-2005-0017705 | 2/2005 |

OTHER PUBLICATIONS

Korean Office Action issued May 18, 2012 in counterpart Korean Patent Application No. 10-2006-0005875 (3 pages, in Korean).

(Continued)

*Primary Examiner* — Diane Mizrahi
(74) *Attorney, Agent, or Firm* — NSIP Law (57) ABSTRACT

A method for configuring a Wireless Local Area Network (WLAN) within a Wireless Metropolitan Area Network (WMAN) and a wireless communication system supporting the same are provided. A dual-mode terminal is used as a relay for relaying between the WMAN and the WLAN and the relay divides a total service period into a WMAN period and a WLAN period. For the WMAN period, the relay accesses the WMAN and implements a WMAN service and for the WLAN period, it accesses the WLAN and implements a WLAN service.

22 Claims, 8 Drawing Sheets

(56) References Cited

U.S. PATENT DOCUMENTS

| | | |
|---|---|---|
| 7,542,439 B2 * | 6/2009 | Rubin .......................... 370/315 |
| 7,561,547 B2 | 7/2009 | Brideglall |
| 2005/0030922 A1 | 2/2005 | Lee et al. |
| 2006/0111045 A1 * | 5/2006 | Orlassino et al. ............ 455/41.2 |
| 2007/0160017 A1 * | 7/2007 | Meier et al. ................... 370/338 |
| 2008/0069105 A1 * | 3/2008 | Costa et al. ................... 370/392 |

OTHER PUBLICATIONS

Korean Decision of Grant issued on Jan. 31, 2013, in counterpart Korean Application No. 10-2006-0005875 (5 pages in Korean and 1 page partial English Translation thereof).

* cited by examiner

METHOD FOR CONFIGURING WIRELESS LOCAL AREA NETWORK IN WIRELESS METROPOLITAN AREA NETWORK AND WIRELESS COMMUNICATION SYSTEM SUPPORTING THE SAME

CROSS-REFERENCE TO RELATED APPLICATION(S)

This application claims the benefit under 35 U.S.C.§119(a) of a Korean Patent Application filed in the Korean Intellectual Property Office on Jan. 19, 2006 and assigned Serial No. 2006-05875, the contents of which are incorporated herein by reference.

BACKGROUND

1. Field

The present invention relates generally to a method for configuring a Wireless Local Area Network (WLAN) in a wireless communication network and a wireless communication system supporting the same. More particularly, the present invention relates to a method for configuring a WLAN in a Wireless Metropolitan Area Network (WMAN) and a wireless communication system supporting the same.

2. Description of the Related Art

Mobile communication technology is currently being developed to provide multimedia service by maximizing data rate and frequency use efficiency. A primary example of such technology is a mobile access network. The mobile access network is a generic name for a network that provides high-speed wireless services to terminals within specific service coverage.

Mobile access networks are separated into Wireless Personal Area Network (WPAN), WLAN, and WMAN according to the sizes of their service coverage areas.

A WLAN is configured with an Access Point (AP) installed at an end point of a wired network or with a plurality of terminals. The WLAN offers high-speed wireless communications to terminals within its service coverage. The WLAN offers data rate up to 11 Mbps and ensures limited low-speed mobility. It works around hotspots such as those available in households, schools, hotels and conference centers.

Despite its narrow service coverage as compared to the WMAN, the WLAN boasts of a wide bandwidth.

It is expected that the development of the mobile access networks will gradually increase dependency on wireless communications. In addition, the proliferation of terminals capable of accessing the mobile access networks such as laptops, Personal Computers (PCs), Personal Digital Assistants (PDAs), driven by their small size, light weight and low price, has increased demands for multimedia services in a mobile environment, particularly in hotspot zones.

Despite the widespread use of WLAN terminals, the WLAN covers only a limited area. Accordingly, there exists a pressing need for increasing WLAN coverage.

SUMMARY

An object of the present invention is to address at least the problems and/or disadvantages and to provide at least the advantages described below. Accordingly, an aspect of the present invention is to provide a method for configuring a WLAN within a WMAN by use of a relay and a wireless communication system supporting the same.

An object of the present invention is to provide a method for configuring a WLAN with a neighbor terminal within a WMAN by a dual-mode terminal and a wireless communication system supporting the same.

An object of the present invention is to provide a method for connecting a WMAN to a WLAN configured within the WMAN by a dual-mode terminal and a wireless communication system supporting the same.

An object of the present invention is to provide a method for connecting a terminal located in a WLAN configured within a WMAN to the WMAN through a dual-mode terminal and a wireless communication system supporting the same.

An object of the present invention is to provide a method for differentially providing a real-time service and a non-real-time service in a relay that relays between a WMAN and a WLAN and a wireless communication system supporting the same.

In accordance with the present invention, there is provided a method for configuring a WLAN within a WMAN, in which a relay for relaying between the WMAN and the WLAN implements a WLAN service with at least one terminal connected to the WLAN for a first period and implements a WMAN service with a BS of the WMAN for a second period. Here, the first and second periods do not overlap in time.

In accordance with the present invention, there is provided a wireless communication system for configuring a WLAN within a WMAN, in which a BS supports a WMAN service in the WMAN, at least one terminal receives a WLAN service within the WLAN, and a relay for relaying data between the BS and the at least one terminal implements a WLAN service with at least one terminal connected to the WLAN for a first period and implements a WMAN service with a BS of the WMAN for a second period. Here, the first and second periods do not overlap in time.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION

The matters defined in the description such as a detailed construction and elements are provided to assist in a comprehensive understanding of the preferred embodiments of the invention. Accordingly, those of ordinary skill in the art will recognize that various changes and modifications of the embodiments described herein can be made without departing from the scope and spirit of the invention. Throughout the drawings, the same drawing reference numerals will be understood to refer to the same elements, features and structures. Descriptions of well-known functions and constructions are omitted herein for the sake of clarity and conciseness.

Terms used herein are defined as follows.

Wireless Metropolitan Area Network (WMAN): a wireless network having wide service coverage, such as a cellular network, a wireless broadcasting network and a WMAN.

Wireless Local Area Network (WLAN): a wireless network deployed and released at a particular time in a narrow area such as a conference room. An independent Basic Service Set (IBSS) is one type of WLAN topology. In the present invention, a WLAN can be configured within a WMAN and connected to the WMAN by a relay.

WMAN service: wireless service provided in the WMAN. WMAN services are, for example, a specific contents service and a wireless broadcasting service.

WLAN service: wireless service provided in the WLAN.

WMAN mode: an operation state in which the WMAN service is provided.

WLAN mode: an operation state in which the WLAN service is provided.

WMAN period (or second period): a period for which the relay accesses the WMAN and operates in the WMAN mode.

WLAN period (or first period): a period for which the relay accesses the WLAN and operates in the WLAN mode to provide the WLAN service to a terminal within the WLAN.

Relay: a device that provides a connection between the WMAN and the WLAN using radio resources allocated from the networks. For example, a dual-mode terminal serves as a relay.

Real-time data: streaming data requesting real-time processing without delay. The real-time data are, for example, voice data and broadcasting data.

Non-real-time data: data tolerant of transmission delay, such as packet data.

The following description of the present invention is divided into a description of the configuration of a wireless communication network according to the present invention and a description of preferred embodiments for providing a WMAN service and a WLAN service over the wireless communication network. Particularly, the present invention provides a wireless communication network where a WLAN is configured within a WMAN and a method for efficiently relaying data between the WMAN and the WLAN in the wireless communication network.

Figure 1:
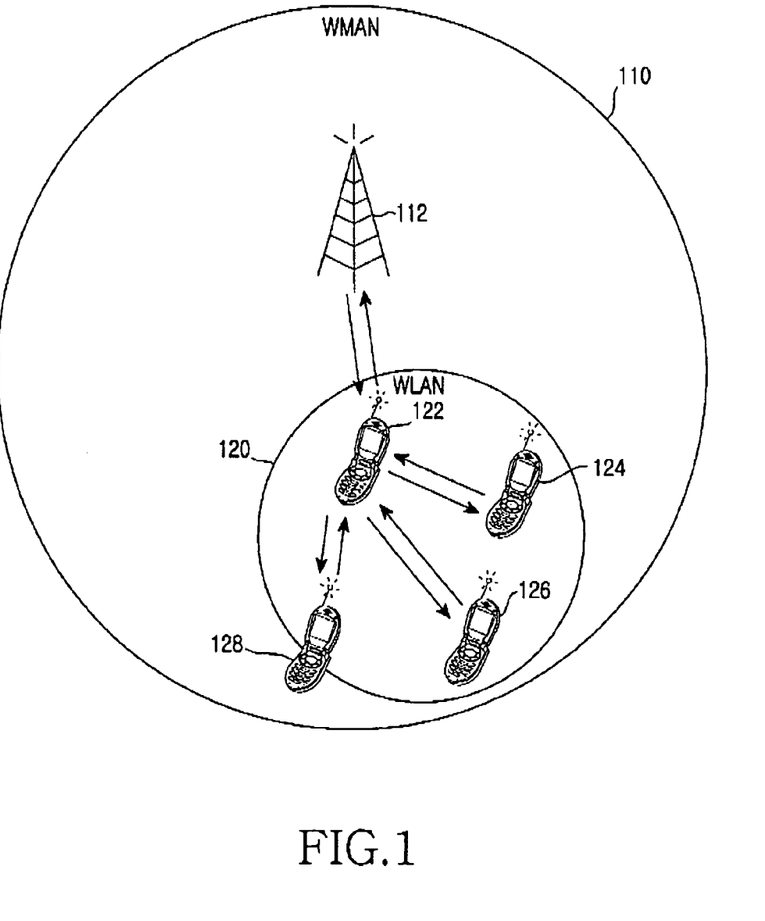
FIG. 1 illustrates the configuration of a wireless communication network according to the present invention.

FIG. 1 illustrates the configuration of a wireless communication network according to the present invention, in which a WLAN is configured within a WMAN.

Referring to FIG. 1, a Base Station (BS) 112 provides the WMAN service to at least one terminal within a WMAN service area 110, which service covers a wide area. For example, the WMAN service is a wireless service provided in a cellular network, a wireless broadcasting network, or a WMAN.

A dual-mode terminal 122 supports WLAN service as well as WMAN service. Hence, the dual-mode terminal 122 supports the WMAN service in a procedure agreed on with the BS 112, operating in WMAN mode. The dual-mode terminal 122 supports the WLAN service in a procedure agreed on with at least one of WLAN terminals 124, 126 and 128, operating in WLAN mode.

As described above, the dual-mode terminal 122 serves as a relay that relays between the BS 112 and the WLAN terminals 124, 126 and 128. Thus, the dual-mode terminal 122 sends data received from the WLAN terminals 124, 126 and 128 to the BS 112 and vice versa.

The dual-mode terminal 122 sends and receives data to and from the WLAN terminals 124, 126 and 128 by polling them during a WLAN period, in which the dual-mode terminal 122 sends and receives data to and from the BS 112.

The dual-mode terminal 122 is capable of simultaneously supporting the WMAN service and the WLAN service, though increasing both throughput and power consumption. Accordingly, there is a need for minimizing the power consumption of the dual-mode terminal 122, while maximizing throughput on a radio link.

For this purpose, the dual-mode terminal 122 alternates between the WMAN service and the WLAN service. A first period and a second period are defined on the time axis to provide the WLAN service and the WMAN service, respectively. Radio resources can also be allocated separately for the first and second periods.

The dual-mode terminal 122 operates in the WMAN mode for the second period and in the WLAN mode for the first period. The first and second periods are determined according to the types and amounts of transmission data, which will be described later in detail.

The WLAN terminals 124, 126 and 128 are located within a WLAN service area 120 and are to receive the WLAN service. A distance over which the dual-mode terminal 122 can provide the WLAN service defines the WLAN service area 120. For example, the WLAN service is a wireless service as provided in Institute of Electrical and Electronics Engineers (IEEE) 802.11 WLAN.

In the wireless communication network with the above-described configuration, the WLAN terminals 124, 126 and 128 can receive the WMAN service via the dual-mode terminal 122.

Provisioning of the WMAN service to WLAN terminals via the dual-mode terminal will be described below in detail in accordance with preferred embodiments of the present invention.

The preferred embodiments of the present invention are described in the context of differentiated data, i.e. data requesting real-time transmission (real-time data) and data requesting non-real-time transmission (non-real-time data). Yet, the real-time data coexist with the non-real-time data in a real wireless communication network and thus it is to be clearly understood that differentiated operations for the real-time data and the non-real-time data may occur together.

A. Transmission of Non-Real-Time Data

Figure 2:
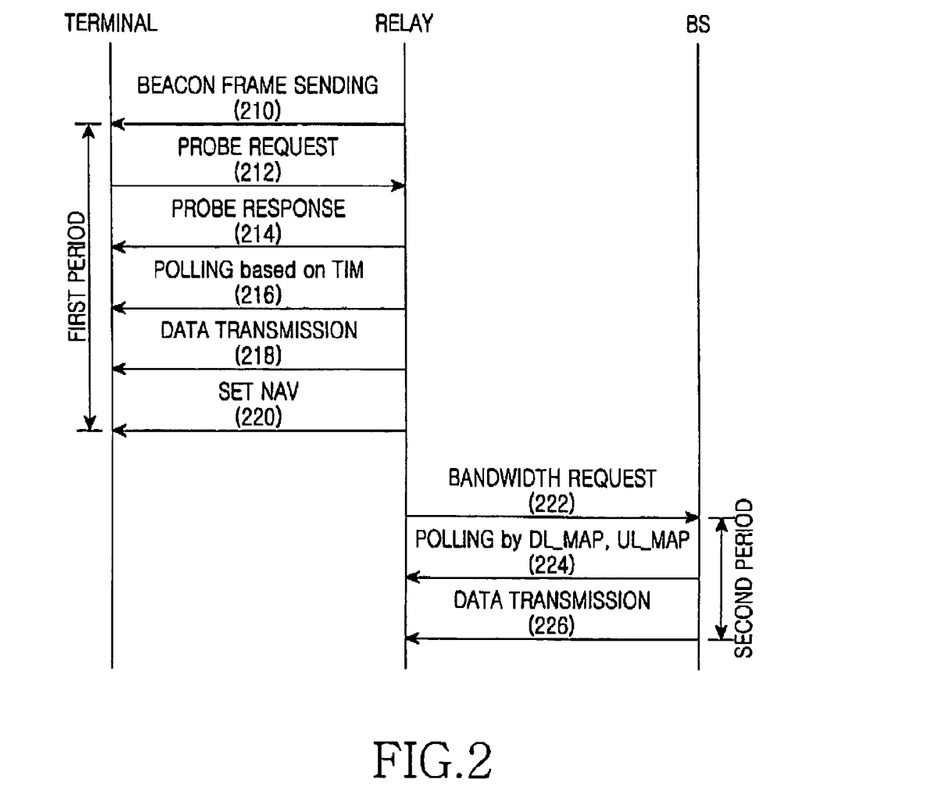
FIG. 2 illustrates a signal flow for providing a non-real-time service in the wireless communication network according to the present invention.
Figure 3:
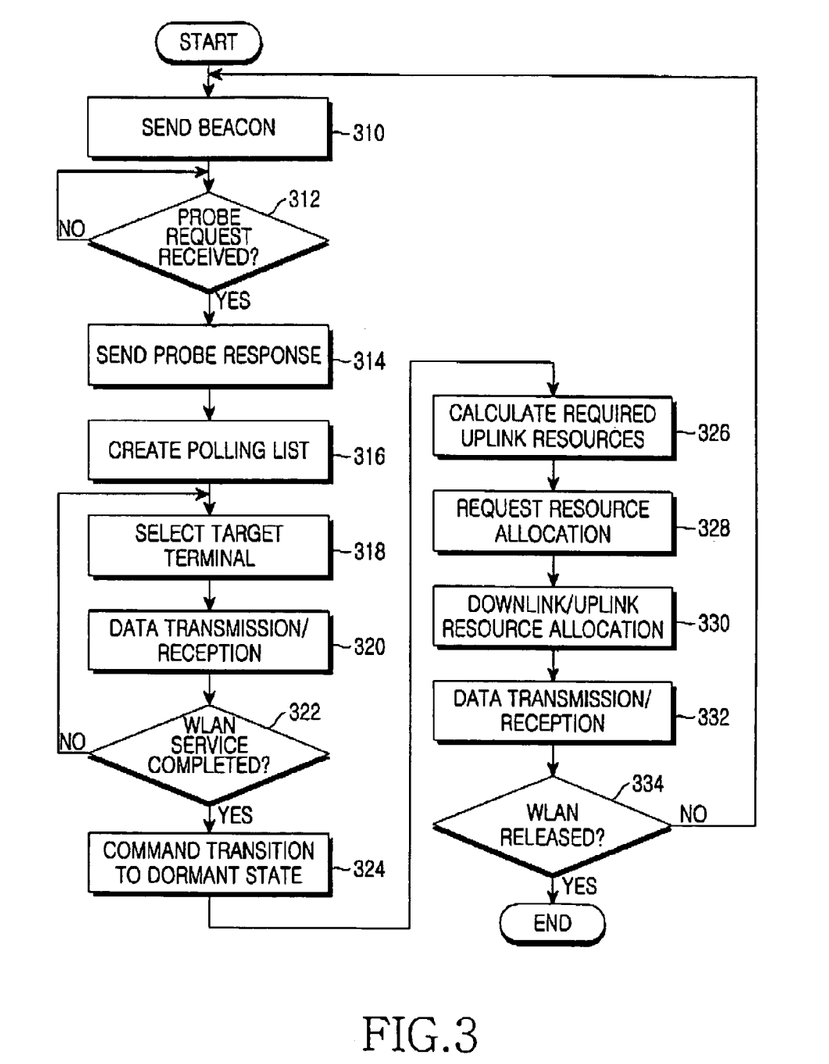
FIG. 3 illustrates a control operation for providing the non-real-time service in a relay according to the present invention.

A detailed description will be made of a method for sending non-real-time data with reference to FIGS. 2 and 3 illustrating a signal flow and a flowchart for providing the non-real-time service.

Figure 6:
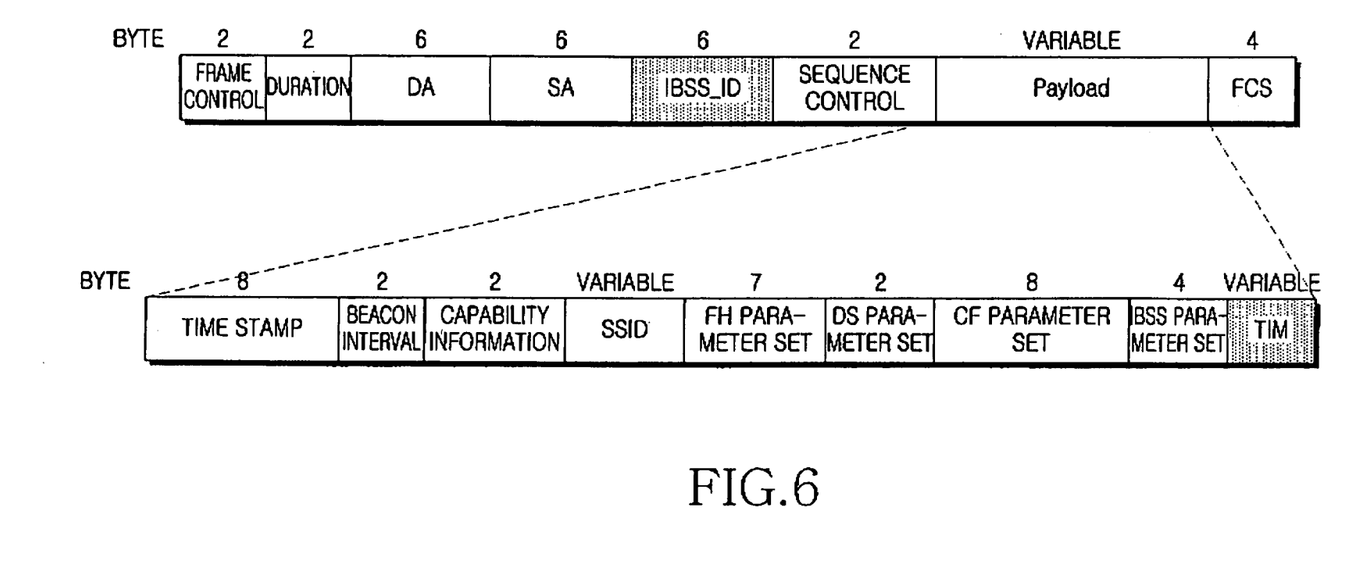
FIG. 6 illustrates the structure of a beacon frame according to the present invention.

Referring to FIG. 2, the relay broadcasts information for configuring the WLAN in a management frame in step 210. The information includes an IDentifier (ID) of the WLAN and a Traffic Indication MAP (TIM). The management frame can be a beacon frame. FIG. 6 illustrates a preferred beacon frame.

The WLAN ID is a Basic Service Set (BSS) ID (BSS_ID) or an Independent Basic Service Set (IBSS) ID (IBSS_ID). The BSS_ID is for a WLAN with an AP, and the IBSS_ID is for a WLAN composed of terminals. In the present invention, the WLAN ID is the IBSS_ID, by way of example.

The TIM includes information about the amounts of data to be sent to specific terminals and IDs of the terminals. Therefore, a terminal can estimate the amount of data to receive from the relay based on the TIM.

Figure 7:
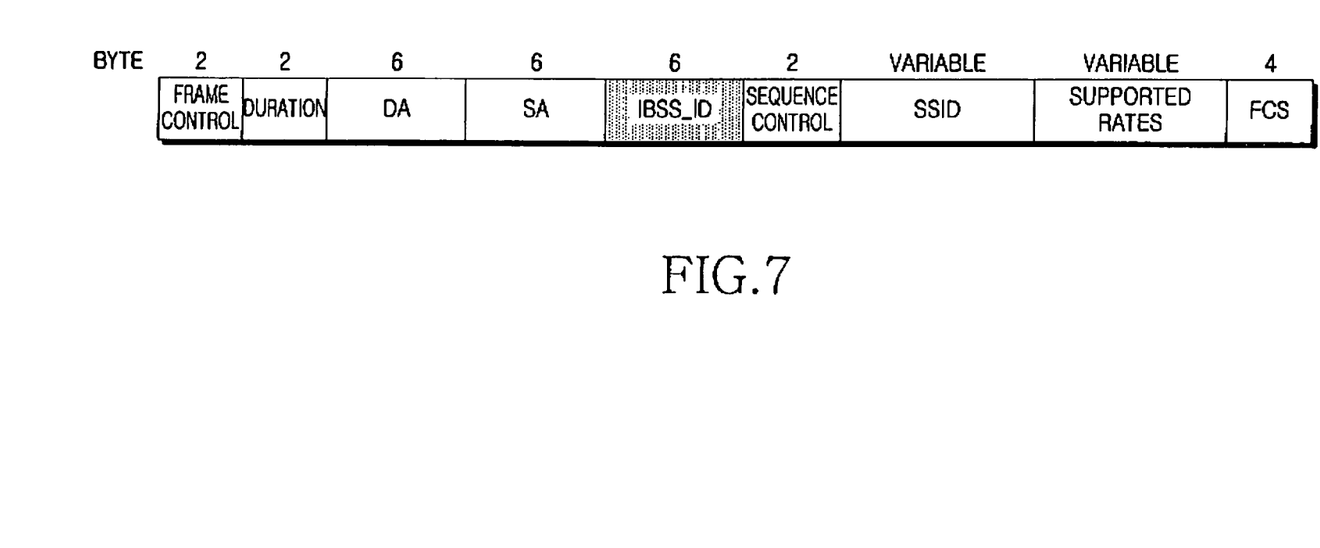
FIG. 7 illustrates the structure of a probe request frame according to the present invention.

In step 212, the terminal requests association with the WLAN to the relay by a management frame. The management frame includes the IBSS_ID set in the beacon frame and supported data rates. A probe request frame can be used as the management frame. The probe request frame is generally used to discover the service area of the WLAN. FIG. 7 illustrates a preferred probe request frame. As illustrated in FIG. 7, the probe request frame includes the IBSS_ID.

Figure 8:
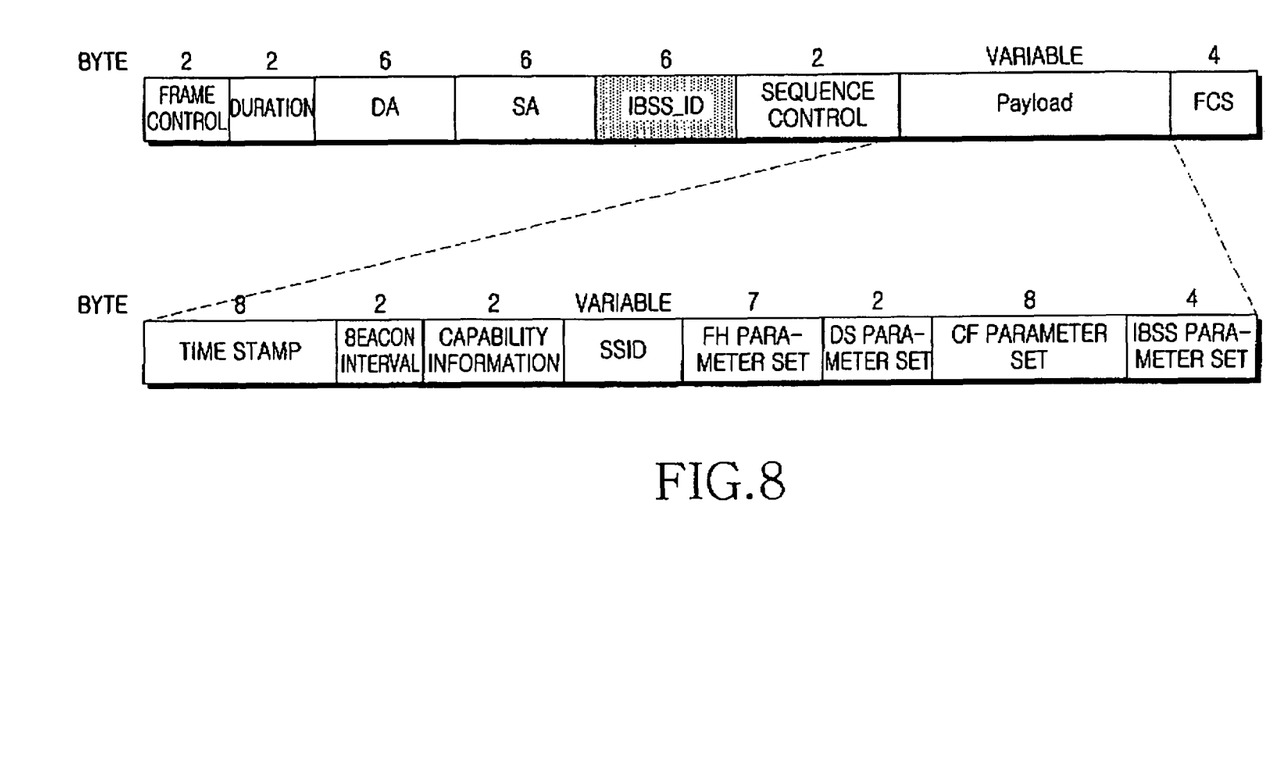
FIG. 8 illustrates the structure of a probe response frame according to the present invention.

The relay determines whether the terminal can associate with the WLAN, considering the capacity of the relay. The relay sends a management frame based on the determination result in step 214. The management frame can be a probe response frame. FIG. 8 illustrates a preferred probe response frame. As illustrated in FIG. 8, the probe response frame includes the IBSS_ID.

While not shown in FIG. 2, association and authentication may additionally be performed between the terminal and the relay.

Upon completion of the terminal's association with the WLAN, the relay individually allows the terminal to access the WLAN by a control frame in step 216. To do so, the relay queries the terminal about whether it has transmission data. The control frame can be a polling frame based on the TIM set in from the beacon frame. The TIM includes the IDs of specific terminals, thus allowing only the terminals to access the WLAN.

The terminal, which has received the polling frame, exchanges data with the relay exchange data in data frames in step 218. That is, the terminal constructs a data frame with uplink data and sends it to the relay. The relay also constructs a data frame with stored downlink data and sends it to the terminal.

When the data transmission is completed, the relay commands the terminal to transition to a dormant state in step 220 in order to prevent the terminal not only from being unnecessarily kept awake for a WMAN period in which the relay operates in the WMAN mode but also from sending data that the relay cannot receive. The transitioning to the dormant state can be commanded by setting a setting value, for example, a Network Allocation Vector (NAV) of a frame, to a predetermined value.

Upon receipt of the transition command, the terminal transitions to the dormant state until the next poling. The dormant state is an operation mode that minimizes power consumption.

The above description has been made in the context of a single terminal. In case of a plurality of terminals, steps 216 and 218 are repeated for each of the terminals. If the transition command should be provided to the individual terminals, steps 216, 218 and 220 are repeated.

The period for which the relay provides the WLAN service to at least one terminal within the WLAN is a WLAN period or a first period.

When the WLAN mode operation is completed, the relay transitions to the WMAN mode for providing the WMAN service in conjunction with the BS within the WMAN.

In step 222, the relay requests allocation of downlink and uplink bandwidths to the BS. The relay dynamically determines uplink resources based on the amount of data received from the terminal by the WLAN service. The resulting optimization of uplink resource allocation in the WMAN leads to efficient use of radio resources.

The BS polls the relay by a DownLink MAP (DL_MAP) and an UpLink MAP (UL_MAP) in step 224. The DL_MAP includes downlink information about the allocated downlink resources and the UL_MAP includes uplink information about the allocated uplink resources. The BS allocates the downlink resources according to the amount of buffered data waiting to be sent to the relay. The BS allocates the uplink resources upon request of the relay.

In step 226, the relay sends the uplink data to the BS according to the UL_MAP and the BS sends the downlink data to the relay according to the DL_MAP.

While one WLAN period and one WMAN period are shown in FIG. 2, they alternate until the WLAN is released. In other words, the relay alternately implements the WLAN and the WMAN services.

Referring to FIG. 3, the relay sends a beacon frame in step 310. As the beacon frame includes a WLAN ID (IBSS_ID), a TIM and address information, a terminal that has received the beacon frame can request access to the WLAN.

In step 312, the relay continuously monitors reception of a probe request frame from the terminal. The monitoring can be about probe request frames from a plurality of unspecified terminals that are expected to listen for the beacon frame. The probe request frame includes the IBSS_ID, requesting access to the WLAN.

Upon receipt of the probe request frame, the relay determines whether the terminal can be accommodated, i.e. whether the WLAN service is available to the terminal. If the terminal can be accommodated, the relay sends a probe response frame to the terminal in step 314.

In step 316, the relay creates a polling list listing terminals to receive the WLAN service in a polling order.

The relay selects a target terminal from the polling list and sends a polling frame to the target terminal based on the TIM in step 318. The polling frame entitles the target terminal to access the WLAN and to send data. In step 320, the relay exchanges data with the target terminal. Upon completion of the data transmission and reception with the target terminal, the relay determines whether the WLAN service has been completely provided in step 322. The determination involves determining whether the relay has polled all terminals listed in the polling list.

If the WLAN service is to be further provided, the relay selects the next target terminal from the polling list in step 318 and exchanges data with the target terminal in step 320.

However, if the WLAN service has been completed, the relay commands all of the terminals listed on the polling list to transition to the dormant state by sending, for example, a broadcasting frame with a NAV set to a predetermined value in step 324. Therefore, the terminals are kept in the dormant state until the next beacon frame or polling frame is received. The transitioning to the dormant state prevents the terminals from sending data while the relay operates in the WMAN mode. The dormant state is an operation mode that minimizes power consumption of the terminals.

The relay calculates the amount of required uplink resources according to the amount of data received from the terminals in the WLAN service in step 326. That is, the relay calculates the amount of uplink resources to request to the BS according to the amount of buffered data waiting to be sent to the BS, which in effect minimizes waste of radio resources.

The relay requests allocation of the calculated uplink resources and allocation of downlink resources to the BS in step 328 and is allocated the uplink and downlink resources in step 330. The resource allocation is made by a DL_MAP and a UL_MAP sent from the BS in a polling procedure.

In step 332, the relay sends data to the BS by the allocated uplink resources. Specifically, the relay sends the data received from the terminals in the WLAN service to the BS.

The relay receives data destined for the terminals from the BS using the allocated downlink resources.

When the data transmission and reception with the BS is completed, the relay determines whether the WLAN has been released in step 334. If the WLAN still exists, the relay repeats steps 310 to 324 in the WLAN mode. However, if the WLAN has been released, this implies that the relay does not need to support the WLAN service any longer. Thus the relay discontinues the WLAN mode operation and performs only the WMAN mode operation.

B. Transmission of Real-Time Data

Figure 4:
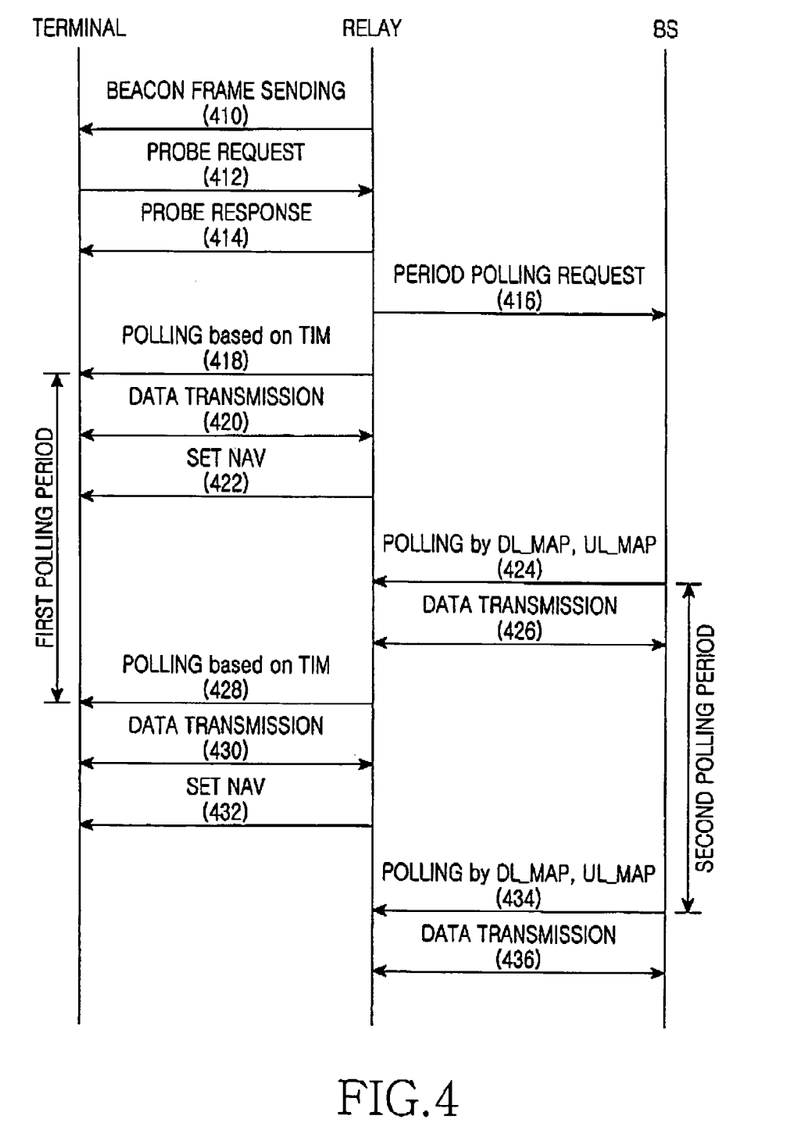
FIG. 4 illustrates a signal flow for providing a real-time service in the wireless communication network according to the present invention.
Figure 5:
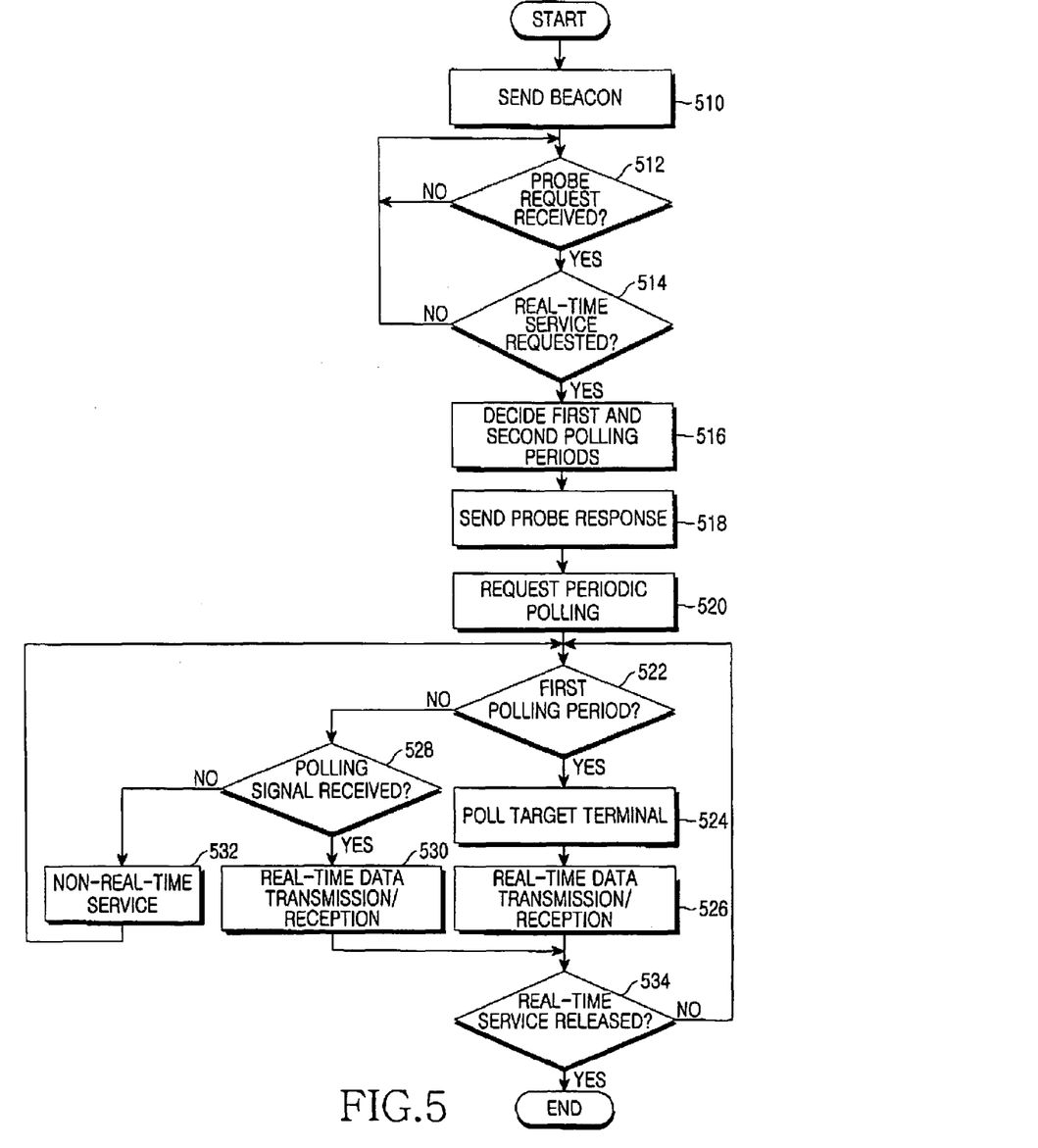
FIG. 5 illustrates a control operation for providing the real-time service in the relay according to the present invention.

A detailed description will be made of a method for sending real-time data with reference to FIGS. 4 and 5 illustrating a signal flow and a flowchart for providing the real-time service.

Referring to FIG. 4, the relay broadcasts information for configuring the WLAN in a management frame in step 410. The information includes the IBSS_ID of the WLAN and a TIM. The management frame can be a beacon frame.

In step 412, a terminal sends a probe request frame including the IBSS_ID and information indicating a service type. The service type information identifies a real-time service or a non-real time service.

The relay determines whether the terminal has requested the real-time service and also determines whether the terminal can associate with the WLAN, considering the capacity of the relay. When the terminal has requested the real-time service, the relay determines a polling period for the real-time service (a first polling period) according to the traffic characteristics of the requested real-time service including the performance of a Compression/DECompression (CODEC) in the relay, the amount of data to be sent, and the amount of resources to be allocated. For example, if the CODEC performs well, the amount of transmission data is small, or many resources are to be allocated, the first polling period is long.

The relay sends a probe response frame including the determination result to the terminal in step 414. The probe response frame includes the IBSS_ID. It may further include the determined first polling period.

In step 416, the relay requests periodic polling to the BS, offering a polling period (a second polling period).

To do so, the relay determines the second polling period on a terminal-by-terminal basis or commonly for all terminals requesting the real-time service. In the former case, the periodic polling of the BS is performed for individual terminals. In the latter case, the periodic polling is performed for all the terminals requesting the real-time service together.

The second polling period is determined, considering traffic characteristics including the CODEC performance of the relay, the amount of data for the real-time service, the amount of resources to be allocated and the number of the terminals requesting the real-time service.

When the first polling period initially comes, the relay sends a polling signal allowing access to the WLAN to a target terminal in step 418. The polling signal is generated based on the TIM.

The target terminal and the relay exchange data in data frames in step 420. That is, the target terminal sends real-time uplink data to the relay and the relay sends stored real-time downlink data to the target terminal.

When the data transmission/reception is completed, the relay commands the terminal to transition to a dormant state in step 422. For the real-time data, step 422 is optional. In the next first polling period, the relay exchanges real-time data with the target terminal in steps 428, 430 and 432.

As described above, the relay predetermines the first polling period, upon request of the terminal for the real-time service and periodically provides real-time data communications in every first polling period. While the above description has been made in the context of a single terminal, in case of a plurality of terminals, steps 418 to 432 are performed for the individual terminals.

The relay receives a first polling signal from the BS in the second polling period in step 424. Upon receipt of the polling signal from the BS, the relay transitions to the WMAN mode. The relay receives a DownLink MAP (DL_MAP) and an UpLink MAP (UL_MAP) in the polling signal. The DL_MAP provides information required for receiving downlink real-time data, and the UL_MAP provides information required for sending uplink real-time data.

The relay sends the real-time uplink data to the BS according to the UL_MAP and the BS sends the real-time downlink data to the relay according to the DL_MAP in step 426. In steps 434 and 436, the relay periodically sends and receives real-time data in every second polling period.

If terminals are polled one by one for the real-time service, the real-time data transmission is also carried out on a terminal-by-terminal basis. However, if only one terminal has requested the real-time service or the real-time service is provided simultaneously to all terminals requesting the real-time data service, the operation is performed for one polling period.

In FIG. 4, only the real-time service is considered. If the real-time service and the non-real-time service are considered together, the relay operates in the WLAN mode in every first polling period.

To be more specific, even when the relay operates in the WMAN mode for the non-real-time service, it transitions to the WLAN mode in the first polling period to provide the real-time service. Upon completion of the real-time service, the relay resumes the WMAN mode operation for the non-real-time service.

Also, even when the relay operates in the WLAN mode for the non-real time data service, upon receipt of a polling signal from the BS, the relay transitions to the WMAN mode and provides the real-time service. Upon completion of the real-time service, the relay resumes the WLAN mode operation for the non-real-time service.

While not described above in detail, the first polling period for the real-time service in the WLAN mode can be equal to the second polling period for the real-time service in the WMAN mode. Also, the first and second polling periods may be different.

In the real-time service, the amount of periodically transmitted real-time data will be constant. Therefore, radio resources may not be allocated periodically for the real-time service. Rather, once radio resources are allocated, they continuously serve the real-time service. In this context, the BS does not need to send a DL_MAP and a UL_MAP each time it sends a polling signal. That is, the BS sends the DL_MAP and the UL_MAP only at the first polling for the real-time service and the DL_MAP and the UL_MAP remain in effect thereafter.

Referring to FIG. 5, the relay sends a beacon frame in step 510. As the beacon frame includes a WLAN ID (IBSS_ID), a TIM, and address information, a terminal that has received the beacon frame can request access to the WLAN.

In step 512, the relay continuously monitors reception of a probe request frame from the terminal. The monitoring can be about a plurality of unspecified terminals that are expected to listen for the beacon frame. The probe request frame includes the IBSS_ID, requesting access to the WLAN.

Upon receipt of the probe request frame, the relay determines whether the terminal requests a real-time service in step 514. If the terminal requests a real-time service, the relay determines whether the real-time service is available to the terminal. If the terminal can receive the real-time service, the relay determines first and second polling periods for the real-time service in step 516 and sends a probe response frame to the terminal in step 518.

Steps 512 to 518 are for a single terminal. In the case of a plurality of terminals requesting the real-time service, the relay determines the first polling period and sends the probe response frame on a terminal-by-terminal basis. It is preferred that the relay determines the second polling period after detecting all terminals requesting the real-time service among the terminals within the WLAN. However, if the terminal does request the real-time service, the relay provides a non-real-time service in the procedure illustrated in FIG. 3.

In step 520, the relay requests periodic polling for the real-time service to the BS, and simultaneously provides the determined second polling period to the BS.

The relay determines whether it is time to poll according to the first polling period in step 522. If it is, the relay ends a polling signal for the real-time service to a target terminal in step 524 and exchanges real-time data with the target terminal in step 526. If it is not time to poll in step 522, then the procedure goes to step 528.

The relay determines whether a polling signal has been received from the BS in step 528. Reception of the polling signal implies that it is time for the BS to poll according to the second polling period. The polling signal includes a UL-MAP and a DL-MAP for the real-time service.

Upon receipt of the polling signal from the BS, the relay sends and receives data to and from the BS according to the UL_MAP and the DL_MAP in step 530.

If it is not time to poll according to the first polling period and the polling signal has not been received from the BS, the relay continues the non-real-time service in step 532.

Upon completion of the data transmission/reception to and from the target terminal or the BS, the relay determines whether the target terminal has requested release of the real-time service in step 534. If the real-time service is to be provided further, the relay returns to step 522. If the real-time service has been released, the relay ends the real-time service. Then, the relay operates only for the non-real-time service.

While the real-time service and the non-real-time service have been described separately in the preferred embodiments of the present invention, it is obvious to those skilled in the art that the relay can implement the real-time service and the non-real-time service in a single algorithm. That is, when a polling period comes for the real-time service during the ongoing non-real-time service, the relay discontinues the non-real-time service and provides the real-time service. When the real-time service is completed, the relay resumes the non-real-time service.

As is apparent from the above description, the present invention advantageously configures a WLAN temporarily by use of a dual-mode terminal supporting the WMAN service and the WLAN service. When a WMAN is commercialized, the WLAN can be extended using the dual-mode terminal. Therefore, network configuration cost is saved and packet users can be considerably increased.

As the dual-mode terminal supports the WMAN service and the WLAN service in time division, the throughput of a radio link is maximized and the power consumption of the dual-mode terminal is minimized.

While the invention has been shown and described with reference to certain preferred embodiments of the present invention, it will be understood by those skilled in the art that various changes in form and details may be made therein without departing from the spirit and scope of the present invention as defined by the appended claims and their equivalents.

What is claimed is:

1. A method of a dual-mode terminal for configuring a Wireless Local Area Network (WLAN) within a Wireless Metropolitan Area Network (WMAN), the method comprising:
   providing a WLAN service, for a first period, to at least one other terminal connected to the WLAN, the dual-mode terminal being configured as a relay for relaying data from the a least one other terminal between the WMAN and the WLAN; and
   implementing a WMAN service with a Base Station (BS) of the WMAN for a second period, to transmit data received from the at least one other terminal to the BS,
   wherein the second period does not overlap in time with the first period, and
   wherein the dual-mode terminal alternates between the first period and the second period a plurality of times until the at least one other terminal is finished transmitting data to the WMAN.

2. The method of claim 1, further comprising determining required uplink resources for the WMAN service according to an amount of data received from the at least one other terminal during the WLAN service, and requesting allocation of the determined uplink resources to the BS.

3. The method of claim 2, wherein the WLAN service providing comprises:
   broadcasting a beacon frame including identification information of the WLAN to the at least one other terminal;
   sequentially allowing the WLAN service to the at least one other terminal requesting association with the WLAN;
   transmitting and receiving data to and from the association-requesting at least one other terminal; and
   commanding the association-requesting at least one other terminal to transition to a dormant state, when the data transmission and reception are completed.

4. The method of claim 1, wherein the WLAN service providing comprises:
   broadcasting a beacon frame including identification information of the WLAN to the at least one other terminal;
   sequentially allowing the WLAN service to the at least one other terminal requesting association with the WLAN;
   transmitting and receiving data to and from the association-requesting at least one other terminal; and
   commanding the association-requesting at least one other terminal to transition to a dormant state, when the data transmission and reception are completed.

5. The method of claim 1, wherein data transmitted and received in the WLAN service and the WMAN service are non-real-time data.

6. The method of claim 5, further comprising, in response to the at least one other terminal requesting a real-time service, periodically transmitting and receiving, by the dual-mode terminal, real-time data between the at least one other terminal and the BS.

7. The method of claim 6, wherein the real-time data transmission and reception comprises:
   determining a first polling period for the real-time service-requesting at least one other terminal;
   determining a second polling period, when no more terminals request the real-time service;
   notifying the BS of the determined second polling period;
   transmitting and receiving real-time data to and from the real-time service-requesting at least one other terminal by periodically polling the real-time service-requesting at least one other terminal according to the first polling period; and transmitting and receiving real-time data to and from the BS by periodic polling based on the second polling period.

8. The method of claim 7, wherein the first and second polling periods are determined according to traffic characteristics of the real-time service.

9. The method of claim 8, wherein the real-time data transmission and reception to and from the BS comprises transmitting and receiving the real-time data to and from the BS by resources.

10. The method of claim 1, wherein implementing the WMAN service comprises connecting the WLAN with the WMAN by implementing the WMAN service with the BS of the WMAN for the second period, to transmit data received from the at least one other terminal during the WLAN service to the BS during the WMAN service.

11. A wireless communication system for configuring a Wireless Local Area Network (WLAN) within a Wireless Metropolitan Area Network (WMAN), the system comprising:
a Base Station (BS) for supporting a WMAN service in the WMAN;
at least one terminal for receiving a WLAN service within the WLAN; and
a dual-mode terminal providing the WLAN service to the at least one other terminal and for relaying data between the BS and the at least one other terminal,
wherein the dual-mode terminal provides the WLAN service with the at least one other terminal for a first period, implements the WMAN service with the BS for a second period, to transmit data received from the at least one other terminal to the BS,
wherein the second period does not overlap in time with the first period, and
wherein the dual-mode terminal alternates between the first period and the second period a plurality of times until the at leas tone other terminal is finished transmitting data to the WMAN.

12. The wireless communication system of claim 11, wherein the dual-mode terminal determines required uplink resources for the WMAN service according to an amount of data received from the at least one other terminal during the WLAN service and requests allocation of the determined uplink resources to the BS.

13. The wireless communication system of claim 12, wherein the dual-mode terminal broadcasts a beacon frame including identification information of the WLAN to the at least one other terminal, sequentially allows the WLAN service to the at least one other terminal requesting association with the WLAN, transmits and receives data to and from the association-requesting at least one other terminal, and commands the association-requesting at least one other terminal to transition to a dormant state, when the data transmission and reception are completed.

14. The wireless communication system of claim 11, wherein the dual-mode terminal broadcasts a beacon frame including identification information of the WLAN to the at least one other terminal, sequentially allows the WLAN service to the at least one other terminal requesting association with the WLAN, transmits and receives data to and from the association-requesting at least one other terminal, and commands the association-requesting at least one other terminal to transition to a dormant state, when the data transmission and reception are completed.

15. The wireless communication system of claim 11, wherein data transmitted and received in the WLAN service and the WMAN service are non-real-time data.

16. The wireless communication system of claim 15, wherein, in response to the at least one other terminal requesting a real-time service, periodically transmitting and receiving, by the dual-mode terminal, real-time data between the at least one other terminal and the BS.

17. The wireless communication system of claim 16, wherein the dual-mode terminal determines a first polling period for the real-time service-requesting at least one other terminal, determines a second polling period, when no more other terminals request the real-time service, notifies the BS of the determined second polling period, transmits and receives real-time data to and from the real-time service-requesting at least one other terminal by periodically polling the real-time service-requesting at least one other terminal according to the first polling period, and transmits and receives real-time data to and from the BS by periodic polling based on the second polling period.

18. The wireless communication system of claim 17, wherein the first and second polling periods are determined according to traffic characteristics of the real-time service.

19. The wireless communication system of claim 18, wherein the relay transmits and receives the real-time data to and from the BS by resources.

20. The wireless communication system of claim 11, wherein the dual-mode terminal provides the WLAN service to the at least one other terminal for the first period, implements and connects the WLAN to the WMAN by implementing the WMAN service with the BS for the second period, to transmit data received from the at least one other terminal during the WLAN service to the BS during the WMAN service.

21. A dual-mode terminal for configuring a Wireless Local Area Network (WLAN) within a Wireless Metropolitan Area Network (WMAN), the dual-mode terminal comprising:
a transmitter for transmitting a WLAN service, for a first period, to at least one other terminal connected to the WLAN, wherein the dual-mode terminal is configured as a relay for relaying data from the at least one other terminal between the WMAN and the WLAN; and
a receiver for receiving data from the at least one other terminal,
wherein the transmitter transmits the data received from the at least one other terminal to the BS during a second period, the second period does not overlap in time with the first period, and the dual-mode terminal alternates between the first period and the second period a plurality of times until the at least one other terminal is finished transmitting data to the WMAN.

22. The dual-mode terminal of claim 21, further comprising a controller for connecting the WLAN to the WMAN by implementing the WMAN service with the BS during the second period, to transmit the data received from the at least one other terminal during the WLAN service to the BS during the WMAN service.

* * * * *